(12) United States Patent
Mangano et al.

(10) Patent No.: US 8,780,935 B2
(45) Date of Patent: Jul. 15, 2014

(54) COMMUNICATION SYSTEM, AND CORRESPONDING INTEGRATED CIRCUIT AND METHOD

(75) Inventors: Daniele Mangano, Messina (IT); Ignazio Antonino Urzi', Voreppe (FR)

(73) Assignees: STMicroelectronics (Grenoble 2) SAS, Grenoble (FR); STMicroelectronics, S.r.l., Agrate Brianza (MB) (IT)

( * ) Notice: Subject to any disclaimer, the term of this patent is extended or adjusted under 35 U.S.C. 154(b) by 143 days.

(21) Appl. No.: 13/327,419

(22) Filed: Dec. 15, 2011

(65) Prior Publication Data

US 2012/0155489 A1 Jun. 21, 2012

(30) Foreign Application Priority Data

Dec. 20, 2010 (IT) .............................. TO2010A1017
Jan. 24, 2011 (IT) .............................. TO2011A0049

(51) Int. Cl.
*H04J 3/16* (2006.01)

(52) U.S. Cl.
USPC ........................................................ 370/466

(58) Field of Classification Search
CPC . H04L 49/90; H04L 2012/5681; H04L 49/30; H04L 29/06068; H04J 3/0632; H04J 3/0638; H04J 3/0685; G06F 13/405; G06F 13/40559
USPC ......... 370/282, 412–413, 419, 463–466, 503; 710/52, 310; 713/600
See application file for complete search history.

(56) References Cited

U.S. PATENT DOCUMENTS

| | | | |
|---|---|---|---|
| 6,263,410 B1 | 7/2001 | Kao et al. | |
| 6,611,884 B2 | 8/2003 | Castellano | |
| 6,941,433 B1 | 9/2005 | Libby et al. | |
| 7,519,759 B2* | 4/2009 | Kessels et al. | 710/310 |
| 7,519,788 B2 | 4/2009 | LaBerge | |
| 7,669,004 B2 | 2/2010 | Lin et al. | |
| 7,925,803 B2* | 4/2011 | Mangano et al. | 710/52 |
| 2003/0165158 A1 | 9/2003 | Davies et al. | |
| 2004/0128413 A1 | 7/2004 | Chelcea et al. | |
| 2006/0041693 A1 | 2/2006 | Mangano et al. | |
| 2007/0038795 A1 | 2/2007 | Kadomaru | |
| 2008/0123765 A1 | 5/2008 | Oh et al. | |
| 2011/0116337 A1 | 5/2011 | Hay et al. | |

OTHER PUBLICATIONS

Campobello et al, GALS Networks on Chip: A New Solution for Asynchronous Delay-Insensitive, Links, EDAA, 6 pages, 2006.*
Moore et al, Point to Pont GALS Interconnect, IEEE, 7 pages, 2002.*
Italian Search report for ITTO20110049, mailed Jun. 21, 2011, pp. 8.

(Continued)

*Primary Examiner* — Frank Duong
(74) *Attorney, Agent, or Firm* — Hogan Lovells US LLP

(57) ABSTRACT

A communication system includes interfacing between a first synchronous circuit and a second synchronous circuit. The system includes a first interface system and a second interface system. The first interface system receives data from the first synchronous circuit, and encodes the data according to an asynchronous communication protocol. The encoded data are transmitted over a communication channel to the second interface system. The second interface system decodes the data and transmits the decoded data to the second synchronous circuit. The first interface system includes a first FIFO memory for storing temporarily the data received from the first synchronous circuit and the second interface system includes a second FIFO memory for storing temporarily the data transmitted over the communication channel.

20 Claims, 8 Drawing Sheets

(56) References Cited

OTHER PUBLICATIONS

European Search Report, Application No. EP 11 19 2731.5-2212, received Feb. 17, 2012.
European Search Report, Application No. EP 11 19 3208.3-2212.9-2212, received Feb. 21, 2012.
European Search Report, Application No. EP 11 19 3192.9-2212, Feb. 17, 2012.
European Search Report, Application No. IT TO20101017, date of printing Jun. 21, 2011.
European Search Report, Application No. IT TO20110050, date of printing Jun. 21, 2011.

* cited by examiner

COMMUNICATION SYSTEM, AND CORRESPONDING INTEGRATED CIRCUIT AND METHOD

RELATED APPLICATIONS

The present application claims priority of Italian Application Nos. TO2010A001017 filed Dec. 20, 2010 and TO2011A000049 filed Jan. 24, 2011, both of which are incorporated herein by reference in their entirety and are assigned to the assignee of the present application.

FIELD OF THE INVENTION

The present invention relates to communication systems and methods.

The invention has been developed with particular attention paid to its possible use for communication within integrated circuits comprising circuits that use several clock signals (multi-clock).

DESCRIPTION OF THE PRIOR ART

The possibility of using for interconnection communications within an integrated circuit asynchronous communications becomes increasingly more expedient for mitigating the effects of deep-submicron technologies. In fact, said asynchronous communications present the advantage that the communication is delay-insensitive (DI).

FIG. 1 shows in this context a generic system in which a transmitter component 1 transmits data over a communication channel 4 to a receiver component 6. In particular, the data generated by the transmitter component 1 are transmitted by means of an asynchronous communication protocol that uses a delay-insensitive code.

For example, situations of this type often exist in the systems within an integrated circuit (System-on-Chip or SoC), such as for example circuits intended for mobile or multimedia applications, in which various Intellectual Property (IP) circuits are connected together to form complex systems. In fact, such systems can also include asynchronous systems, i.e., systems without clock signals or multi-clock type systems that use several clock signals.

In the example shown in FIG. 1, both components 1 and 6 are synchronous, i.e., the operation of transmitter component is synchronized with a clock signal CKL_TX, generated for example by means of a first oscillator 2, and the operation of the receiver component 6 is synchronized with a clock signal CKL_RX, generated for example by means of a second oscillator 7.

Consequently, to transmit the data generated by component 1 to component 3 interface systems 3 and 5 are necessary. In particular, the interface system 3 is configured for converting the synchronous communication generated by the transmitter component 1 into an asynchronous communication, and the interface system 5 is configured for converting the asynchronous communication received by the interface system 3 again into a synchronous communication.

For example, FIG. 2a is a schematic illustration of a possible synchronous communication scheme based on a two-phase signaling protocol; i.e., the communication is synchronized with a clock signal CLOCK, for example with the rising edge of the signal CLOCK.

In this case, a first control signal REQ is used for signaling that data are available on a bus DATA (i.e., the data are valid), and a second control signal ACK is used for signaling that the receiver component has been able to sample the data DATA.

In particular, to indicate that no new data are available on the DATA bus, the signal REQ has a first logic value, such as, for example, the logic level '0'; i.e., this condition corresponds to an initial phase referred to as RESET.

Instead, when new data are available on the bus DATA (phase FS1), the transmitter component changes, at an instant $t_1$, the logic value of the signal REQ; for example, it changes the logic level from '0' to '1'.

However, due to propagation delays, this change is not immediately detectable, and the receiver component can detect said change of the signal REQ only with the next rising edge of the signal CLOCK, i.e., at an instant $t_2$.

Once the change of the signal REQ (phase FA2) has been detected, the receiver component samples the data on the bus DATA and acknowledges that the data have been read; i.e., the receiver component changes, at the instant $t_2$, the logic value of the signal ACK, for example changing the logic level from '0' to '1'.

Again, said change is only detectable at the next clock cycle, i.e., at an instant $t_3$.

Consequently, when the transmitter component detects the change of the logic value of the signal ACK at the instant $t_3$, the transmission has gone through successfully and both of the components return to the initial condition, i.e., the RESET condition. However, in the case where a number of data must be transferred consecutively at the maximum speed, the signals REQ and ACK could also remain always high.

Said communication is synchronous, because, for generating and sampling the control signals REQ and ACK, both of the components use the same clock signal, i.e., clock signals that have the same frequency.

Instead, asynchronous circuits are frequently based upon a signaling protocol comprising four "handshaking" phases. In this case, the delay insensitivity is obtained via a particular encoding of the data; namely, the validity of the data can be recognized also from the data themselves.

For example, FIG. 2b shows a communication timing diagram based on a four-phase signaling protocol, where the signal on a bus ADATA itself signals the start of a new communication. In this case, a signal AACK is in any case convenient for signaling that the receiver component was able to sample the data.

In particular, also in this case, both the transmitter component and the receiver component are in an initial condition referred to as RESET.

However, for signaling the start and end of a communication, the signal on the bus ADATA is used directly. For example, typical four-phase protocols are the "Dual-Rail" or "1-of-N" protocols.

For example, to transmit the logic value '0' (phase FA1), it is possible to transmit actually at an instant t4 the sequence of bits "01" on two different lines. In a substantially similar way, to transmit the logic value '1' it is possible to transmit actually the sequence of bits "10".

The receiver component detects said signal on the bus ADATA and acknowledges that reading has been performed (phase FA2); i.e., the logic value of the signal AACK changes; for example, the logic level changes from '0' to '1'.

Consequently, the transmitter component detects the change of the signal AACK at an instant $t_5$, and the transmitter component signals the end of the communication at an instant $t_6$ (phase FA3). For instance, to signal the end of the communication, the transmitter component can transmit the sequence of bits "00".

Finally, said sequence of bits is detected by the receiver component, and also this returns to the initial condition; i.e., the receiver component again changes the logic value of the signal AACK.

The transmitter component can detect said change at an instant $t_7$ and terminate the communication (phase FA4).

Hence, a four-phase protocol can also be detected in an asynchronous way, i.e., at any moment.

SUMMARY OF THE INVENTION

The object of the invention is to provide a communication system in which the communications exchanged between two synchronous circuits are transmitted by means of an asynchronous communication protocol that is delay insensitive.

In fact, the inventors have noted that of considerable importance is the way in which the interface operations are carried out to prevent long delays in the exchange of information.

With a view to achieving the aforesaid object, the subject of the invention is an interface system having the characteristics specified in Claim 1. The invention also regards a corresponding integrated circuit and a corresponding method. Further advantageous characteristics of the invention form the subject of the dependent claims.

The claims form an integral part of the technical teaching provided herein relative to the invention.

Various embodiments described herein refer to solutions that enable interfacing of a first synchronous circuit with a second synchronous circuit.

According to the solution described herein, the communication system comprises a first interface system configured for receiving data from the first synchronous circuit and for transmitting data encoded according to an asynchronous communication protocol across a communication channel. The system also comprises a second interface system configured for receiving the encoded data and for transmitting data decoded according to the asynchronous communication protocol to the second synchronous circuit.

In various embodiments, the first interface system comprises a first First-In First-Out memory for temporarily saving the data received from said first synchronous circuit and the second interface system comprises a second First-In First-Out memory for temporarily saving the data transmitted across the communication channel.

In various embodiments, the communication system is configured for transmitting to the first synchronous circuit a control signal determined as a function of the state of the first and the second FIFO memory. For example, the control signal can be an acknowledge signal that indicates to the first synchronous circuit that the first interface system has received the data.

In this case, the control signal can be a binary signal, where the logical value of the control signal is only changed, when the first interface system has received data from the first synchronous circuit, and both the first and second memory still have at least one free memory location.

In various embodiments, the solution described herein is also used to provide an asynchronous pipeline.

BRIEF DESCRIPTION OF THE DRAWINGS

The invention will now be described purely by way of non-limiting example with reference to the annexed drawings, in which.

DETAILED DESCRIPTION

Figure 1:
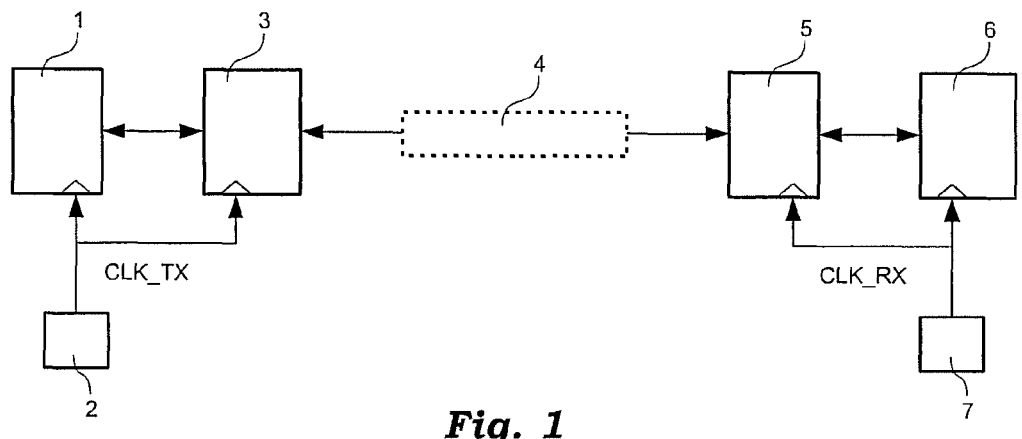
FIGS. 1, 2a and 2b have already been described previously with respect to the prior art.

Illustrated in the ensuing description are various specific details aimed at an in-depth understanding of the embodiments. The embodiments can be provided without one or more of the specific details, or with other methods, components, materials, etc. In other cases, known structures, materials, or operations are not shown or described in detail to prevent various aspects of the embodiments from being obscured.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. In addition, particular conformations, structures, or characteristics can be combined in any adequate way in one or more embodiments.

The references used herein are only provided for convenience and hence do not define the sphere of protection or the scope of the embodiments.

As mentioned previously, the object of the invention is to provide a communication system for transmitting data from a transmitter component 1 to a receiver component 6, where both components are synchronous and the data are transmitted by means of an asynchronous communication protocol. For said objective interface systems 3 and 5 are necessary, where the interface system 3 is configured for converting the synchronous communication generated by the transmitter component 1 into an asynchronous communication, and the interface system 5 is configured for converting the asynchronous communication received from the interface system over the communication channel 4 again into a synchronous communication.

Figure 3:
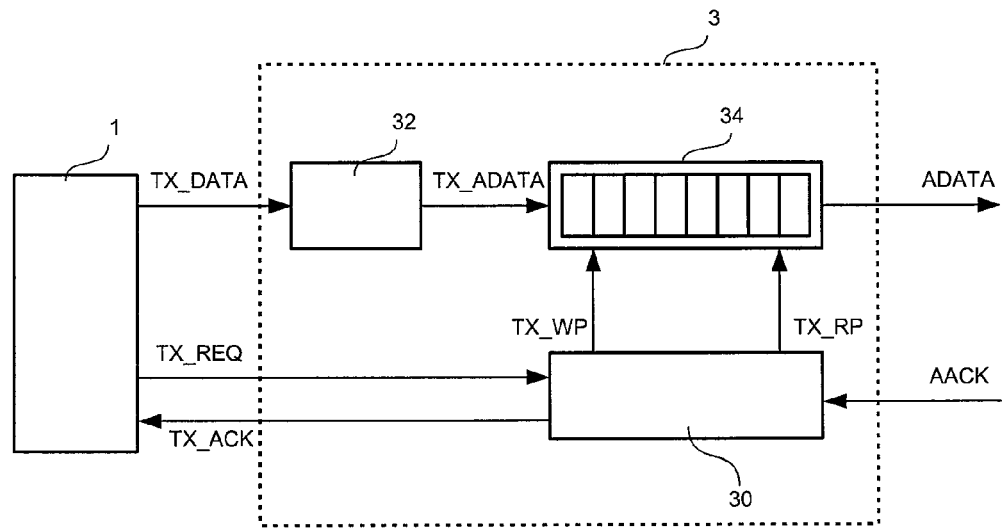
FIGS. 3 and 5 show possible embodiments of interface systems for converting a synchronous communication into an asynchronous communication.

FIG. 3 shows a possible embodiment of the interface system 3 configured for converting the synchronous communication generated by the transmitter component 1 into an asynchronous communication.

In the embodiment considered, the system 3 receives a data signal TX_DATA from the synchronous circuit 1 and a signal TX_REQ indicating that the data signal TX_DATA contains new data. Preferably, the system 3 also transmits to the synchronous circuit 1 a signal TX_ACK acknowledging that the data TX_DATA has been read.

Next the system 3 converts the data received from circuit 1 into encoded data ADATA according to the asynchronous communication protocol, and transmits it across channel 4 and the interface system 5 to the synchronous system 6. To verify that the data have been received, the system 3 receives an asynchronous read-acknowledge signal AACK from the system 5.

In particular, to handle communication between circuits 1 and 5, the system 3 comprises a FIFO memory 34, in which the current write and read locations are indicated respectively via a write pointer TX_WP and a read pointer TX_RP.

Moreover, the system 3 comprises a circuit 32, such as for example, a combinational circuit, that receives the data TX_DATA from the circuit 1 and supplies at output encoded data TX_ADATA. In particular, the circuit 32 is configured for encoding the data TX_DATA according to the specific asynchronous protocol used for the asynchronous communication.

In the embodiment considered, the encoded data TX_ADATA are then written in the FIFO memory 34. For example, in the embodiment considered, said writing of the data TX_ADATA in the FIFO memory 34 is controlled via a control circuit 30 that manages the write pointer TX_WP. For example, in the embodiment considered, the write pointer TX_WP is incremented, and the signal TX_ADATA is saved in the respective memory location when the signal TX_REQ indicates that new data are available. The person skilled in the art will appreciate that it is also possible to first write the data TX_ADATA in the FIFO memory 34 and only afterwards to increment the write pointer TX_WP.

Figure 2:
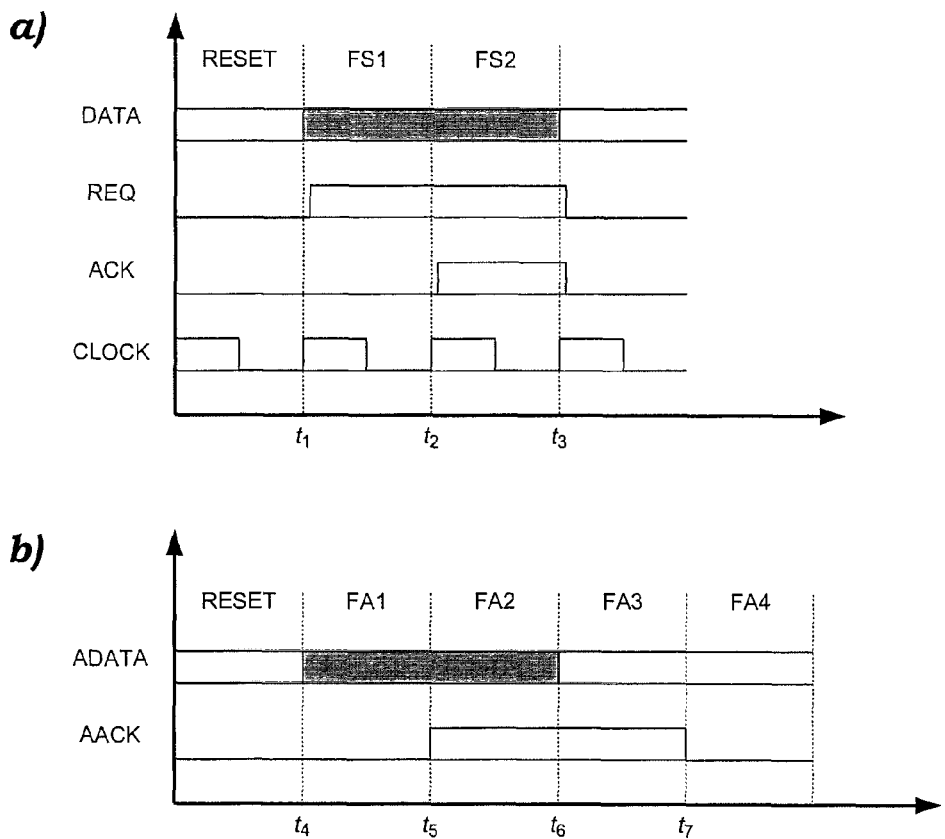

This makes it possible to perform directly phase FA1 of FIG. 2*b*. In fact, in the case of the first writing of data in the FIFO memory 34, the encoded data TX_ADATA are already available at output from the FIFO memory 34, i.e., the data are immediately available on the bus ADATA.

In addition, saving of data already encoded in the FIFO memory 34 avoids the need for further control circuits for verifying transmission of the data on the bus ADATA.

In the embodiment considered, passage to phase FA3 of FIG. 2*b* is carried out asynchronously and is driven directly by the signal AACK. For example, in the embodiment considered, the signal AACK is used for resetting the contents of the memory location being currently read. In particular, in one embodiment, the reset operation is driven directly by the rising edge of the signal AACK. For this purpose, each memory location of the FIFO memory 34 can be made up of a plurality of registers with asynchronous reset.

In general, the control circuit 30 is thus configured for resetting the contents of the memory location indicated by the read pointer TX_RP when a rising edge of the signal AACK is detected, or alternatively a falling edge is detected in the case of an active-low signaling protocol.

Finally, passage to the fourth phase FA4 in FIG. 2*b* is again driven via the signal AACK. In particular, the system 3 remains waiting for the signal AACK to change again its logic value in order to terminate the communication. For example, in the embodiment considered, reading of the data ADATA from the FIFO memory 34 is controlled via the control circuit 30 that manages also the read pointer TX_RP. For example, in the embodiment considered, the read pointer TX_RP is incremented when a falling edge of the signal AACK is detected, or alternatively a rising edge is detected in the case of an active-low signaling protocol.

This means, in the case where further data are available in the FIFO memory 34, that said data are immediately set on the bus ADATA. Next, the control circuit 30 once again detects the rising edge and the falling edge of the signal AACK to verify proper reception of the data and to complete transmission.

Figure 4:
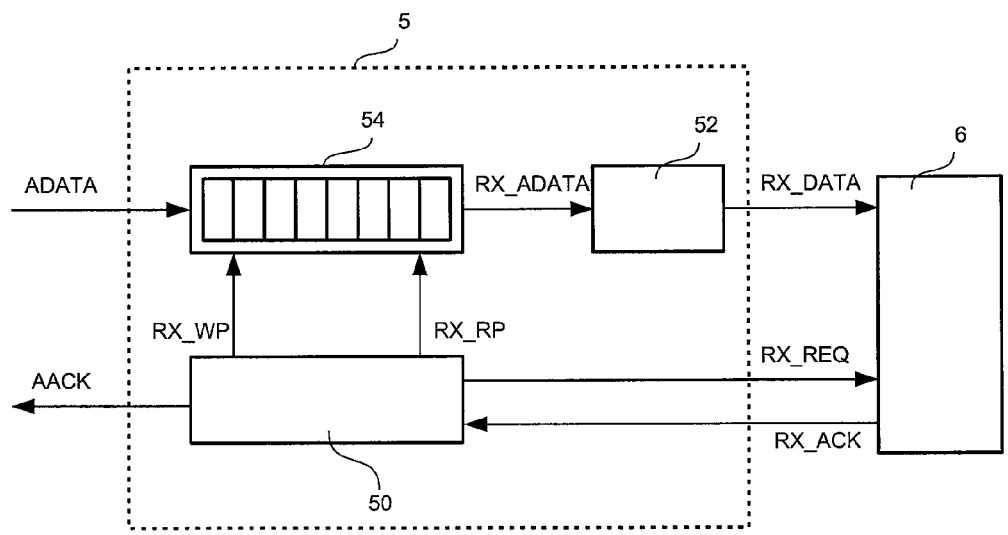
FIGS. 4, 6 and 7 show possible embodiments of interface systems for converting a synchronous communication into an asynchronous communication.

Instead, FIG. 4 shows a possible embodiment of the interface system 5 configured for converting the asynchronous communication received from the interface system 3 again into a synchronous communication.

In the embodiment considered, the system 5 receives the data signal ADATA from the system 3 and, to acknowledge that the data have been received, the system 5 generates an asynchronous read-acknowledge signal AACK.

Next, the system 5 converts the data received from system 3 and transmits them to the synchronous circuit 6.

In particular, to handle communication between the circuits 3 and 6, the system 5 comprises a FIFO memory 54, in which the current write and read locations are indicated respectively via a write pointer RX_WP and a read pointer RX_RP.

In the embodiment considered, writing of the data ADATA in the FIFO memory 54 is controlled via a control circuit 50 that manages the write pointer RX_WP as a function of the data signal ADATA. For example, in the embodiment considered, the write pointer RX_WP is incremented when valid data are detected on the ADATA line (phase FA1 in FIG. 2*b*).

At the same time the logic value of the AACK signal can be changed to acknowledge writing of the data ADATA to the FIFO memory 54 (phase FA2).

Next, when the line ADATA indicates the end of transmission (phase FA3), the logic value of the AACK signal is changed again (phase FA4).

The control circuit 50 is also responsible for reading the data from the FIFO memory 54. In particular, in the embodiment considered, the circuit 50 monitors the state of the FIFO memory 54, and when new data are available, the circuit increments the read pointer and reads said data RX_ADATA from the FIFO memory 54. In particular, in the embodiment considered, such reading is carried out synchronously, i.e., in response to clock signals from the synchronous circuit 6.

Preferably, the circuit 50 is also configured for changing the logic value of the line RX_REQ to indicate that new data are available.

In addition, the system comprises a circuit 52, such as for example a combinatorial circuit, that converts the data read from the FIFO memory 54, i.e., the data RX_ADATA, and supplies decoded data at output. In particular, the circuit 52 is configured for decoding the data RX_ADATA according to the specific asynchronous protocol used for asynchronous communication.

Finally, when the circuit 50 detects a change in the logic value of the signal RX_ACK (phase FS2 in FIG. 2*a*), the circuit 50 can terminate the transmission.

Thus, the circuit 50 described previously, periodically monitors the state of the FIFO memory 54 and, when new data are available in the FIFO memory 54, such data are transmitted immediately to the synchronous circuit 6.

In one embodiment, in order to prevent possible glitches on the asynchronous interface, the logic circuits used for selecting the memory locations within the FIFO memory use a Gray encoding.

Figure 5:
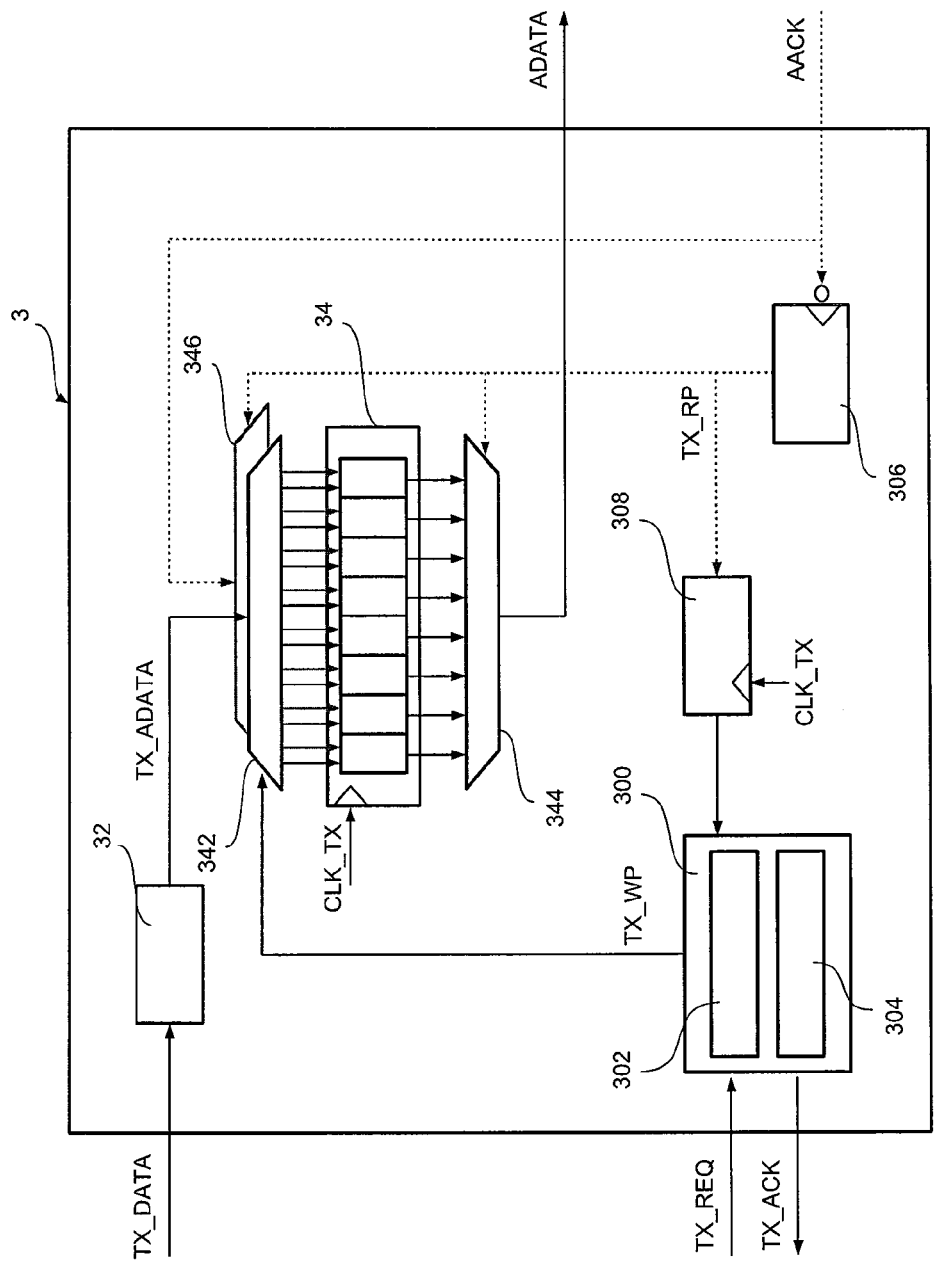

For example, FIG. 5 shows a possible embodiment of the interface system 3, in which a Gray encoding can also be used.

Also in this case, the system 3 comprises a circuit 32 for implementing a delay-insensitive encoding. In particular, the block 32 receives at input the data generated by the circuit 1 and supplies at output encoded data TX_ADATA. In general, the solution described here can be applied to any delay-insensitive encoding, and the input data TX_DATA can include both data and control signals, for example of known communication protocols for integrated circuits, such as, for example, the protocols Advanced eXtensible Interface (AXI), STBus, Open Core Protocol International Partnership (OCP-IP).

The system comprises also a FIFO memory 34, in which writing is carried out synchronously with a clock signal CLK_TX, i.e., the clock signal of the synchronous component 1 that transmits data, and reading is carried out asynchronously; i.e., reading is driven primarily via the asynchronous signal AACK that acknowledges that the data have been read.

For example, in the embodiment considered, the control circuit of the interface system 3 comprises a first circuit 300 configured for managing the synchronous communication with the component 1 and for generating the write pointer TX_WP of the FIFO memory 34.

For example, in the embodiment considered, the circuit 300 comprises a first block 302 dedicated to generation of the write pointer TX_WP, where the block 302 is configured for incrementing the write pointer TX_WP when the signal TX_REQ indicates that new data are available on the TX_DATA bus. In particular, in the embodiment considered, said operation is synchronized with the operation of the circuit 1; namely, the verification of the logic level of the signal TX_REQ and possible increment of the write pointer TX_WP are carried out at each rising edge (or alternatively at each falling edge) of the signal CLK_TX.

For example, said operation can be implemented by means of a counter 302 with Gray encoding that is autonomously reset when the value of the counter 302 reaches the total number of memory locations of the FIFO memory 34.

In the embodiment considered, the circuit 300 also comprises a second block 304 dedicated to generate the signal TX_ACK. In particular, in the embodiment considered, the circuit 304 is configured for acknowledging reception of the data on the bus TX_DATA; i.e., the signal TX_ACK on the synchronous interface is asserted only if the FIFO memory 34 still contains at least one free memory location.

For example, in one embodiment, to determine the state of the FIFO memory, the circuit 304 is configured for managing an additional control signal referred to as TX_CREDIT, which is saved in a register.

In particular, the signal TX_CREDIT is initialized at the total number of the memory locations of the FIFO memory 34 and decremented at each writing of data in the FIFO memory 34.

Moreover, the signal TX_CREDIT is updated at certain instants k to take into account any possible reading operations. For example, said updating can be carried out at each reading or periodically, for example, at each clock cycle of the signal CLK_TX, according to the following equation:

$$TX\_CREDIT_k = TX\_CREDIT_{k-1} + (TX\_RP_k - TX\_RP_{k-1}) \quad (1)$$

In the embodiment considered, the control circuit of the interface system 3 also comprises a second circuit 306 configured for managing the asynchronous communication with the circuit 5 and for generating the read pointer TX_RP of the FIFO memory 34.

For example, in the embodiment considered, the circuit 306 is configured for incrementing the read pointer TX_RP when the asynchronous signal AACK indicates that the transmission of the data ADATA is through. For example, for the case shown in FIG. 2b, the read pointer TX_RP is incremented at each falling edge of the signal AACK.

In the embodiment considered, said operation is implemented via a counter 306 with Gray encoding, which is autonomously reset when the value of the counter 306 reaches the total number of memory locations of the FIFO memory 34. In particular, in the embodiment considered, the inverted version of the asynchronous signal AACK is used directly as clock signal for said counter 306.

In the embodiment considered, a synchronization circuit 308 is also envisioned, configured for synchronizing the read pointer TX_RP with the clock signal of the circuit 300, i.e., with the clock signal CLK_TX. For instance, said circuit 308 can be provided via a cascade of two or more flip-flops. In particular, this synchronization circuit ensures that the circuit 300, in particular the circuit 304, uses valid versions of the read pointer TX_RP, i.e., the operation of the circuit 304 is actually based on a synchronized version of the read pointer TX_RP.

Purely by way of illustration, FIG. 5 shows also the multiplexers and de-multiplexers of the FIFO memory 34.

In particular, in the embodiment considered, the FIFO memory 34 comprises a de-multiplexer 342 configured for forwarding the current encoded data TX_ADATA to the memory location selected via the write pointer TX_WP. The relation between the value of the write pointer TX_WP and the memory location is not required to be a linear function, but it is sufficient to assign a specific memory location to each value of the pointer TX_WP. For example, the de-multiplexer could also take into account the encoding of the write pointer TX_WP.

In a substantially similar way, the FIFO memory 34 comprises also a multiplexer 344, configured for forwarding the contents of the memory location currently selected via the read pointer TX_RP to the asynchronous circuit 5, i.e., on the bus ADATA.

As mentioned previously, passage from phase FA1 to phase FA3 shown in FIG. 2b may be provided via a reset of the contents of the memory location currently being read. For example, in the embodiment considered, the FIFO memory 34 is provided via a plurality of registers, where each register comprises a reset port. In this case, it is possible to use a further de-multiplexer 346 configured for connecting the asynchronous signal AACK to the reset ports of the registers that correspond to the memory location currently selected via the read pointer TX_RP.

Consequently, when the interface system 3 is initialized, the FIFO memory 34 is empty, and the value of the signal TX_CREDIT corresponds to the total number of the memory locations in the FIFO memory 34.

Moreover, when new data are saved in the FIFO memory, said data are automatically forwarded on the bus ADATA, i.e., the encoded data TX_ADATA are immediately available on the bus ADATA, because the value of the read pointer TX_RP corresponds initially to the value of the write pointer TX_WP.

Next, when the signal AACK is asserted, i.e., when the rising edge of the signal AACK is detected, the memory location currently selected via the read pointer TX_RP is reset. For example, for a typical asynchronous protocol, the contents of the memory location are erased, and all the lines of the bus ADATA are set to '0'.

Next, when the signal AACK is de-asserted, i.e., when the falling edge of the signal AACK is detected, the read pointer TX_RP is incremented, and the contents of the new memory location are available immediately on the bus ADATA, i.e., in the case where the memory location contains data, said data are set automatically on the bus ADATA and a new transaction starts.

The solution described previously cannot present reset problems, because once the contents of a memory location have been erased, the read pointer must pass through the chain of synchronization registers. In fact, at least n clock cycles must pass before the location can be written again, where n corresponds to the number of flip-flops in the synchronization chain 308.

In fact, the circuit 300 can save new data in the FIFO memory 34 and verify the state of the FIFO memory also in parallel to the asynchronous transmission described previously. Moreover, if the FIFO memory is full, the circuit 300 is configured for inhibiting read acknowledgement; i.e., the synchronous acknowledge signal TX_ACK is not asserted or alternatively is no longer de-asserted.

Figure 6:
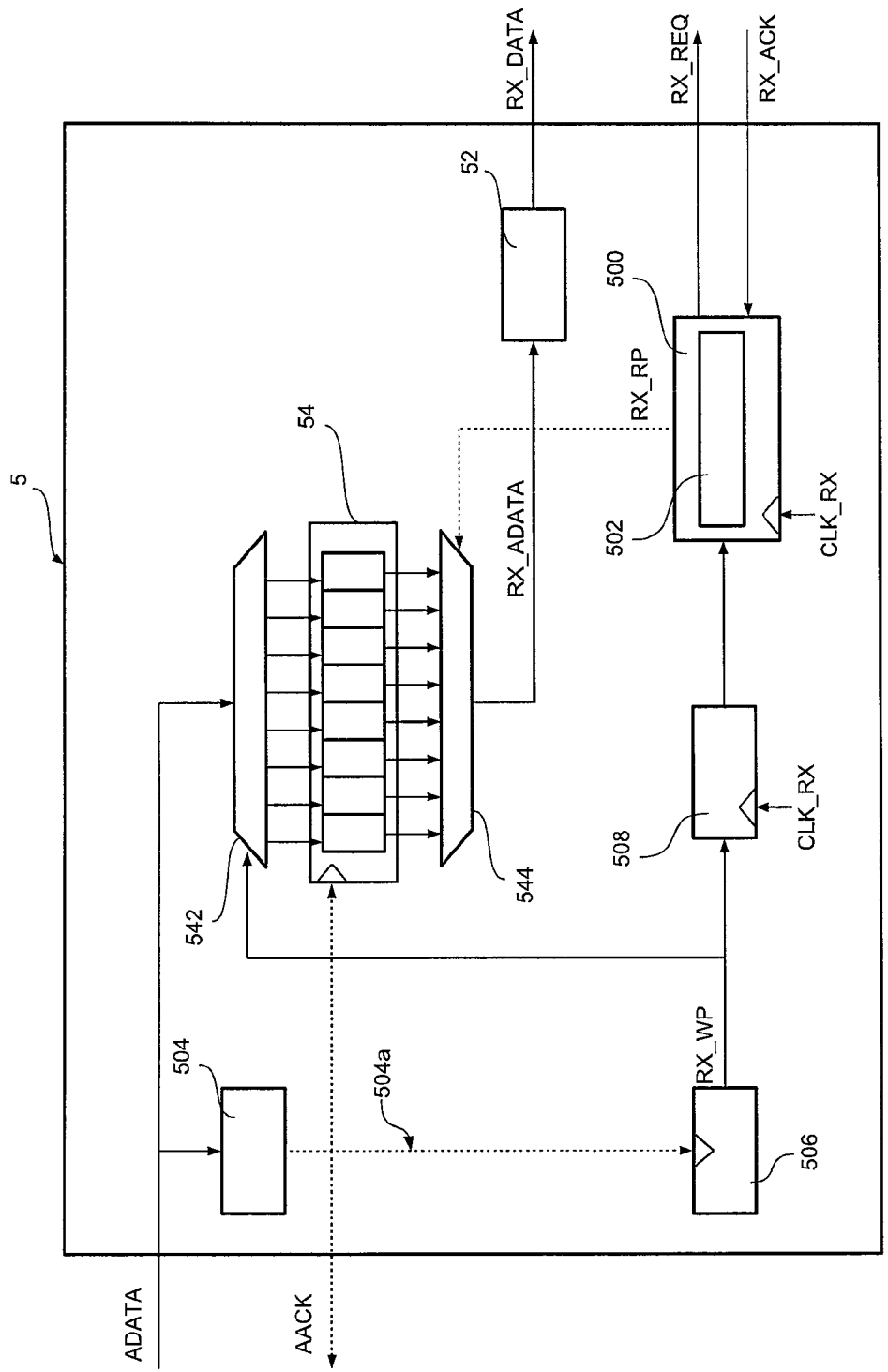

Instead, FIG. 6 shows a possible embodiment of the interface system 5, in which also a Gray encoding can be used.

In the embodiment considered, the system 5 comprises a FIFO memory 54, in which writing is carried out asynchronously, i.e. in response to the contents of the ADATA signal, and reading is carried out synchronously with a clock signal CLK_RX, i.e., the clock signal of the synchronous component 6 that receives data.

Also in this case, the system 5 comprises a circuit 52 for implementing delay-insensitive decoding. In particular, the block 52 receives at input the data RX_ADATA read from the FIFO memory 52 and supplies at output decoded data that are transmitted directly on bus RX_ADATA.

For example, in the embodiment considered, the control circuit of the interface system 5 comprises a detection circuit 504 configured for changing the logic value of a signal 504a when valid data are detected on the line ADATA. In general, implementation of said circuit 504 depends on the specific asynchronous protocol used. Still, such circuit must guarantee that the logic values of the signal 504a is changed only when the data signal ADATA is stable.

For example, for the exemplary case shown in FIG. 2b, the logic value of the signal 504a is set to '1' when the line ADATA contains valid data, and is set again to '0' when all the signals of the line ADATA are set to '0' (return-to-zero).

In the embodiment considered, said signal 504a is used to save the data on the ADATA line in the FIFO memory 54. In particular, in the embodiment considered, said signal is used as a clock signal for writing the data in the FIFO memory 54.

In the embodiment considered, said signal 504a is also used for incrementing the write pointer RX_WP. For example in the embodiment considered, the write pointer RX_WP is generated via a counter 506, such as for example a counter with Gray encoding, that is autonomously reset when the value of the counter 506 reaches the total number of memory location of the FIFO memory 54. In this case, the signal 504a can be used as a clock signal for the counter 506, so that the counter (and consequently also the write pointer RX_WP) is incremented when valid data are detected on the ADATA line.

Finally, the signal 504a can also be used to acknowledge reading of the data. For example, in the embodiment considered, the signal 504a is used directly as signal AACK. The person skilled in the art will appreciate that the operation described previously can also operate when the logic values of the various signals are inverted, for example when using an active-low signaling protocol.

In the embodiment considered, the control circuit comprises also a circuit 500 configured for managing the synchronous communication with the component 6 and for generating a read pointer RX_RP.

For example, in the embodiment considered, the circuit 500 comprises a block 502 dedicated to generating the read pointer RX_RP, in which the block 502 is configured for incrementing the read pointer RX_RP synchronously when new data are available in the FIFO memory 54. For example, the circuit 502 can be provided by means of a counter, such as for example a counter with Gray encoding.

Moreover, to detect the presence of new data in the FIFO memory 54, the write pointer RX_RP can be compared with the read pointer RX_RP. In the embodiment considered, a synchronization circuit 508 is also envisioned, configured for synchronizing the read pointer RX_RP with the clock signal of the circuit 500, i.e., with the clock signal CLK_RX. For instance, said circuit 508 can be provided via a cascade of two or more flip-flops. In particular, this synchronization circuit ensures that the circuit 500 uses valid versions of the write pointer RX_WP, i.e., the operation of the circuit 500 is actually based on a synchronized version of the write pointer RX_WP.

As mentioned previously, the circuit 500 is also responsible for managing control signals of the synchronized communication with circuit 6. For example, the circuit 500 can be configured for changing the logic value of signal TX_REQ simultaneously with incrementing of the read pointer TX_RP, i.e., when new data are available in the FIFO memory 54. Instead, the signal TX_REQ can be reset when a change is detected in the TX_ACK signal that acknowledges reading of the data RX_DATA. In particular, in the embodiment considered, all the operations of block 300 are performed synchronously, i.e., in response to clock signals CLK_RX.

Purely by way of illustration, the multiplexers and de-multiplexers of the FIFO memory 54 also are shown in FIG. 6.

In particular, in the embodiment considered, the FIFO memory 54 comprises a de-multiplexer 542 configured for forwarding the current encoded data ADATA to the memory location selected via the write pointer RX_WP. Also in this case it is not required that the relation between the value of the write pointer RX_WP and the memory location be a linear function, but it is sufficient to assign a specific memory location to each value of the pointer RX_WP. For example, the de-multiplexer 542 could also take into account the encoding of the write pointer RX_WP.

In a substantially similar way, the FIFO memory 54 comprises also a multiplexer 544, configured for forwarding the contents RX_ADATA of the memory location currently selected via the read pointer TX_RP to the circuit 52 and consequently to the synchronous circuit 6.

Consequently, when the interface system 5 is initialized, the FIFO memory 54 is empty and the read pointer value RX_RP initially corresponds to the value of the write pointer RX_WP.

Next, when the bus ADATA contains new data, the circuit 504 changes the logical value of the signal 504a, for example the circuit 504 can change the logical value of the signal 504a from '0' to '1'. Such change drives both the writing of the data on the bus ADATA in the FIFO memory 54 and incrementing of the write pointer RX_WP. For example, in the embodiment considered, said signal 504a is used as a clock signal for the writing interface of the FIFO memory 54 and the circuit 506, i.e., the writing of data ADATA in the FIFO memory 54 and incrementing of the write pointer RX_WP are carried out with the rising edge of the signal 504a.

In addition, as mentioned previously, the signal 504a can also be used for generating the read-acknowledge signal AACK. Consequently, when the signals on the bus ADATA are reset, the logic value of the AACK signal also changes automatically to signal that new data can be received.

Once the data ADATA are written in the FIFO memory 54, such data are immediately available at output of the FIFO memory, because the read pointer value RX_RP corresponds initially to the memory location in which the first data were written. Consequently, the data at output of the FIFO memory 54, namely, the encoded data RX_ADATA, are immediately decoded via circuit 34 and forwarded to the synchronous circuit 6, i.e., on the bus RX_DATA.

Once the write pointer RX_WP has gone through the synchronization chain 508, the circuit 500 can determine if data have been written in FIFO memory 54 and the circuit 300 changes the logic value of the signal RX_REQ to indicate that new data are available.

Next, when a change is detected in the logic value of the signal RX_ACK indicating that the synchronous circuit 2 has received the data via the line RX_DATA, the read pointer RX_RP is incremented and, if the next memory location is empty, the signal RX_REQ is reset again.

The solution described previously does not comprise a mechanism for signaling to the interface system 3 the fact that no further data can be received, for example because the FIFO memory 54 is full.

Figure 7:
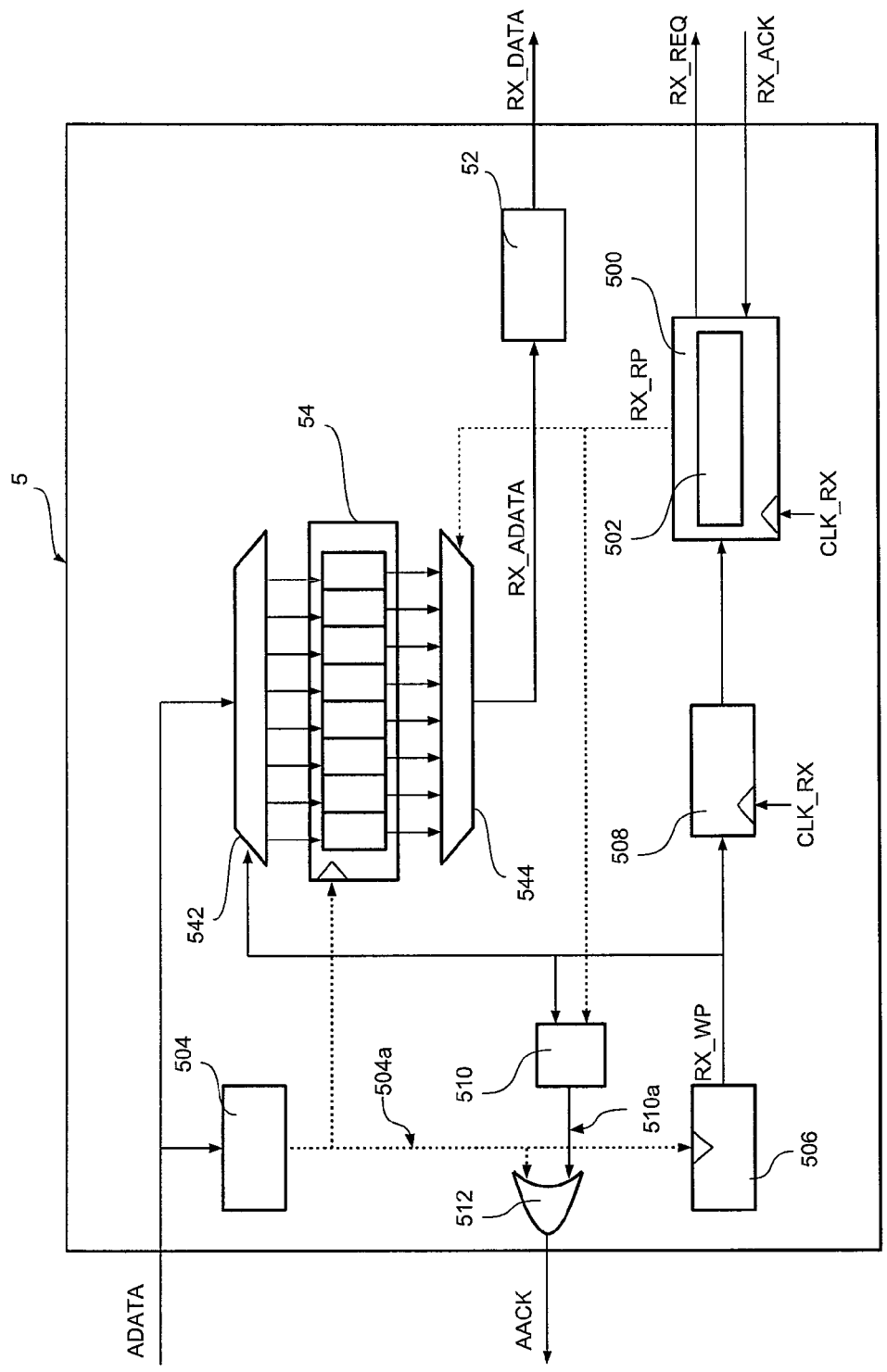

FIG. 7 shows instead an embodiment in which the system 5 comprises also means for determining the signal AACK as a function of the status of FIFO memory 54.

In particular, in the embodiment considered, the system 5 comprises means 510 configured for generating a signal 510a indicating that the FIFO memory 54 is either full or that there is at least one free memory location. For example, in the embodiment considered, a comparator 510 is used, configured for comparing the write pointer RX_WP with the read pointer RX_RP.

Consequently, a simple logic port 512 can be used to determine the logic value of the AACK signal in function of the signals 504a and 510a. For example, for the logic levels described previously for signals 204a and 210a, an OR port 512 can be used.

Consequently, when the data in FIFO memory 54 are written, the logic value of signal 504a is set to '1', i.e., the logic value of the AACK signal is set to '1' independently of the state of the FIFO memory 54. Next, in the case in which FIFO memory 54 becomes full, also the logic value of the signal 510a is set to '1'. Therefore, also when the signal on the bus ADATA is reset and the logic value of signal 504a is set again to '0', the logic value of signal AACK remains set to '1' until the data in FIFO memory 54 are read.

The solution described previously also has the advantage that possible glitches on the line AACK are avoided, which is fundamental to guaranteeing proper functioning of the system 3. In fact, the circuit shown in FIG. 7 guarantees that only the value of the read pointer RX_RP can change when the signal 510a is set to '1', because the asynchronous communication with circuit 3 is disabled.

Figure 8:
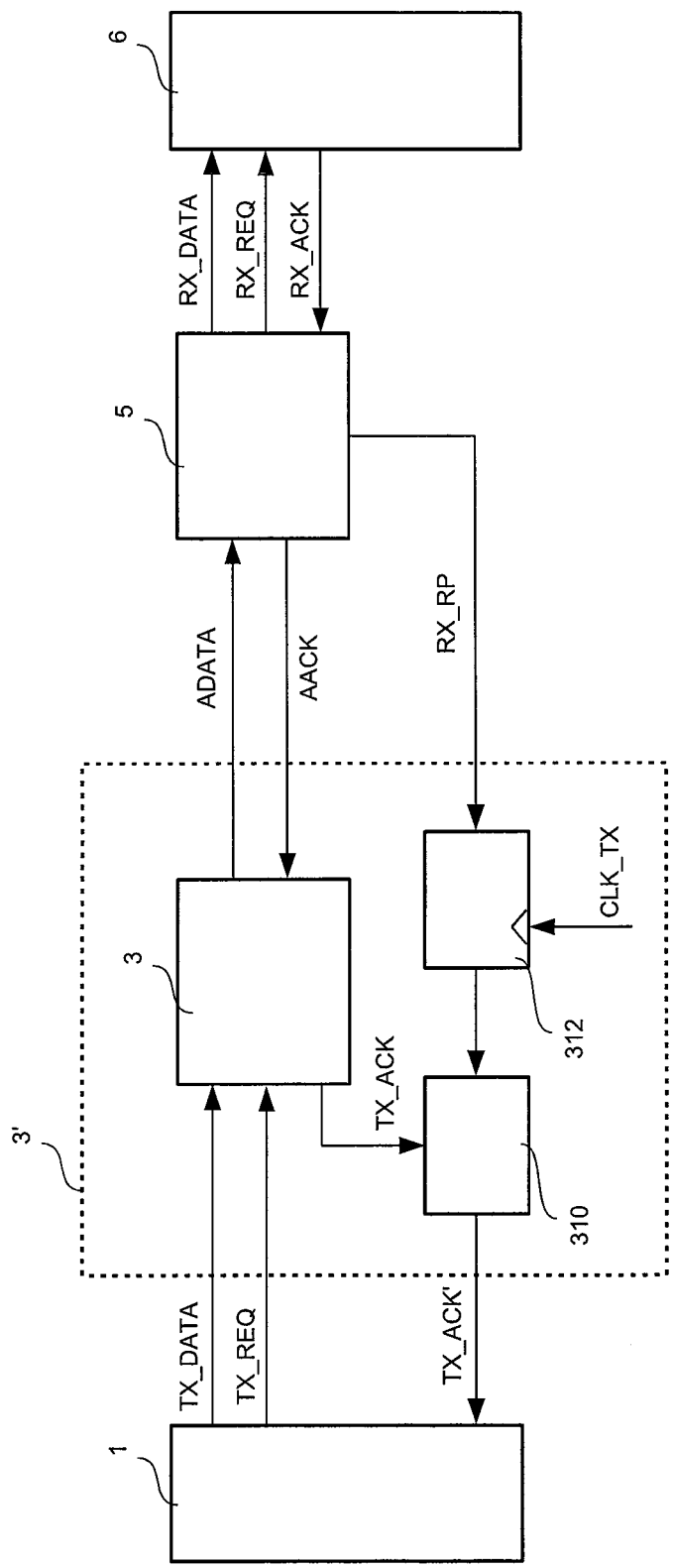
FIG. 8 is a block diagram of an embodiment of a communication system.

FIG. 8 shows an embodiment of the entire communication system.

In the embodiment considered, the transmitter component 1 transmits a data signal TX_DATA to the interface system 3 and a signal TX_REQ indicating that the data signal TX_DATA contains new data.

Next, the interface system 3 converts the data received from circuit 1 into encoded data ADATA, and transmits it to the system interface 5.

The system 5 received the data signal ADATA and, to acknowledge reception of the data, generates an asynchronous read-acknowledgement signal AACK.

Next, the system 5 converts the data received from the system 3 and transmits it to the synchronous circuit 6. In particular, in the embodiment considered, the interface system 5 transmits to the receiver component 6 a data signal RX_DATA and a signal RX_REQ indicating that the data signal RX_DATA contains new data.

Preferably, the receiver component 6 transmits a signal RX_ACK to the synchronous circuit 1 to acknowledge that the data RX_DATA has been read.

As mentioned previously, said read-acknowledge signal is not forwarded directly to the transmitter component, but is used only within the interface system 5.

Still, as shown with reference to FIGS. 5 and 7 both of the interface systems 3 and 5 can include mechanisms for acknowledging transmissions based on the state of the respective FIFO memories 34 and 54.

In particular, the interface system 3 can be configured for changing the logic value of the signal TX_ACK only when at least one free memory location is still available in the FIFO memory 34, and the interface system 5 can be configured for changing the logic value of the AACK signal only when at least one free memory location is still available in FIFO memory 54.

Consequently, in the case in which the transmitter component 1 transmits data and the receiver component 6 is not able to receive more data, the FIFO memory 54 would be filled first, which is indicated via the AACK signal. Next, the FIFO memory 34 would be filled also, and only at this point would data transmissions no longer be acknowledged via the TX_ACK signal.

However, although from the operational point of view this mechanism is sufficient, in practice it can be difficult to ensure that the signal 510a, necessary for suitable masking of the AACK signal, is actually free of glitches.

In one embodiment, to avoid this problem, an additional flow control unit is used.

For example, in the embodiment shown in FIG. 8, a modified interface system 3' is used. In particular, said system 3' comprises an interface system 3 as described previously and a flow control unit 310 configured for determining the logic value of a read-acknowledge signal TX_ACK' as a function of the state of FIFO memory 34 and of the FIFO memory 54. In the embodiment considered, the transmitter component 1 then receives the signal TX_ACK' and not the signal TX_ACK generated by the interface system 3.

For example, in the embodiment considered, the flow control unit 310 is configured for acknowledging the writing of data TX_DATA only when the interface system 3 and the interface system 5 can still receive data.

As mentioned previously, the interface system 3 may already comprise a control circuit 300 configured for generating a signal TX_ACK indicating that:

a) the data TX_DATA have been written in FIFO memory 34, and b) the FIFO memory 34 still comprises at least one free memory location.

Therefore, in the embodiment considered, the unit 310 uses the signal TX_ACK directly. Still, in the case in which an interface system 3 different from that shown in FIG. 5 is used, part of the control circuit 300, in particular the circuit 304, can also be implemented inside unit 310.

In the embodiment considered, the unit 310 also receives the read pointer RX_RP from the interface system 5. In fact, the signal RX_RP allows determination of the number of the memory location used within the FIFO memory 54.

For this purpose, a synchronization circuit 312 can also be envisioned, configured for synchronizing the read pointer RX_RP with the clock signal of the circuit 310, i.e., with the clock signal CLK_TX. For instance, said circuit 312 can be provided via a cascade of two or more flip-flops. In particular, this synchronization circuit ensures that the circuit 310 uses valid versions of the write pointer RX_WP, i.e., the operation of the circuit 310 is actually based on a synchronized version of the write pointer RX_WP.

For example, in one embodiment, in order to determine the state of the FIFO memory 54, the circuit 310 is configured for managing an additional control signal referred to as RX_CREDIT, which is saved in a register.

In particular, the signal RX_CREDIT is initialized at the total number of the memory locations of the FIFO memory 54 and decremented at each writing of data in the FIFO memory 34, i.e., when data are received from the transmitter component 1.

Moreover, the signal RX_CREDIT is updated at certain instants k to take into account any possible reading operations of FIFO memory 54. For example, said updating can be carried out at each clock cycle of the signal CLK_TX, according to the following equation:

$$RX\_CREDIT_k = RX\_CREDIT_{k-1} + (RX\_RP_k - RX\_RP_{k-1}) \quad (2)$$

In this case, the circuit 310 is configured for setting the logic value of the signal TX_ACK' to '1' only in the case where the logic value of the signal TX_ACK is also '1' and the value of the signal RX_CREDIT is greater than zero, i.e., the FIFO memory 54 of the system 5 still has at least one free memory location. Instead, the logic value of the signal TX_ACK' is set to '0' in the case where the signal TX_ACK is '0' or the value of the signal RX_CREDIT is zero, i.e., the FIFO memory 54 is full.

Figure 9:
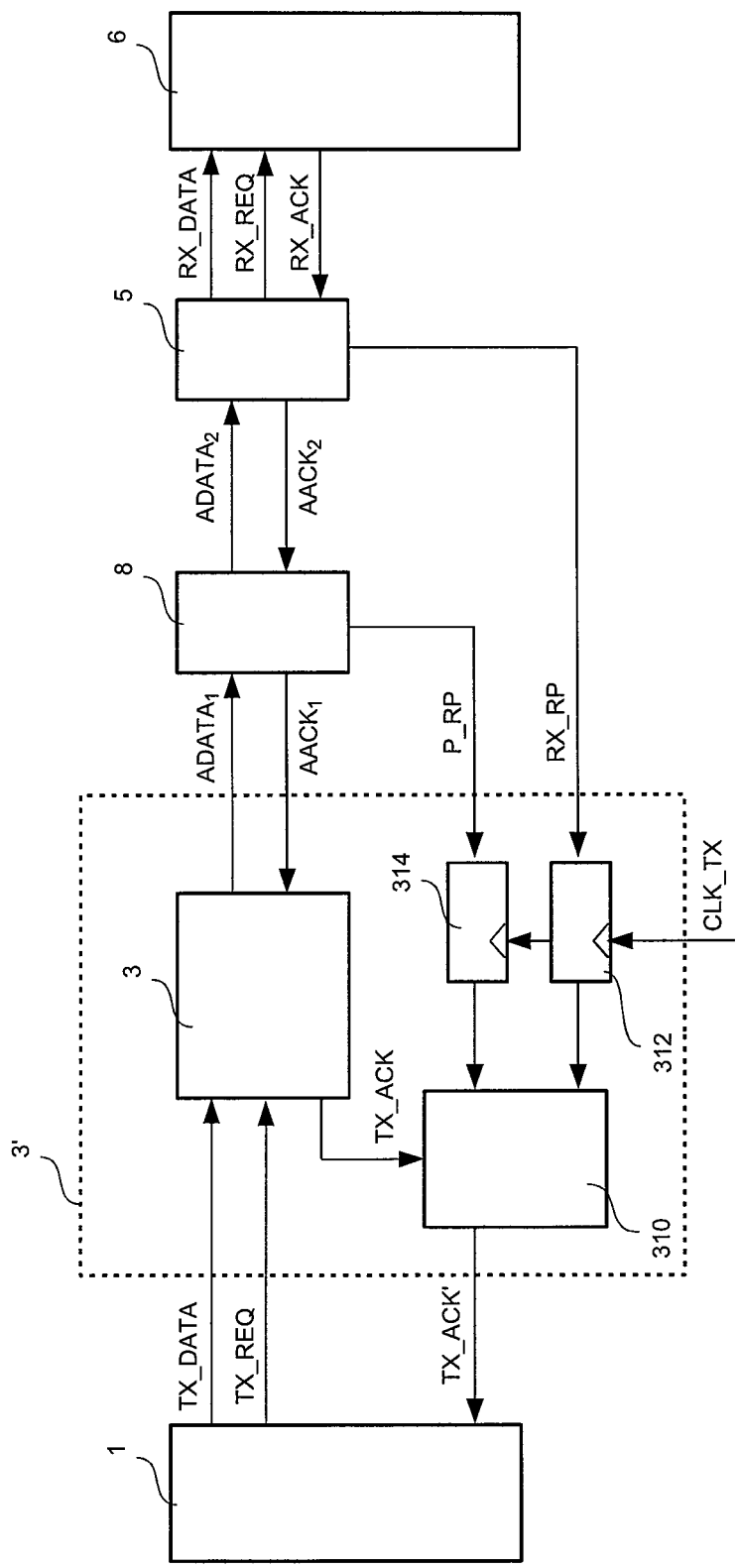
FIG. 9 is a block diagram of an embodiment of a communication system in which an asynchronous pipeline is used.

FIG. 9 shows an embodiment of the communication system in which an asynchronous pipeline is used, i.e., the asynchronous connection between the interface systems 3 and 5 comprises at least one asynchronous pipeline stage 8. For example such architecture is advantageous when long distances must be crossed inside the integrated circuit.

Such pipeline stages 8 can be passive or active. In particular, in the case where the stage 8 is passive, the size of the buffer within the stage 8 is the same as the FIFO memory 54 within the interface system 5. In fact, in this case, the flow control circuit 310 guarantees that the pipeline stage 8 does not save data that cannot be forwarded to the system 5.

Instead, in the case where the stage 8 is active, i.e., the size of the buffer within the stage 8 is either lesser or greater than the size of the FIFO memory 54, the circuit 310 must also consider the state of the buffer within the stage 8.

For example, in the embodiment considered, also the stage 8 comprises a FIFO memory, in which the current write and read locations are indicated via a write pointer P_WP and a read pointer P_RP, respectively. In this case, in a way substantially similar to what was previously described for the read pointer RX_RP, the read pointer P_RP can be used for determining the state of the FIFO memory within stage 8. For such purpose, a synchronization circuit 314 can also be envisioned configured for synchronizing the read pointer P_RP with the clock signal of circuit 310. i.e., with the clock signal CLK_TX. For instance, said circuit 314 can be provided via a cascade of two or more flip-flops. In particular, this synchronization circuit ensures that the circuit 310 uses valid versions of the write pointer P_RP, i.e., the operation of the circuit 310 is actually based on a synchronized version of the write pointer P_RP.

For example, in the embodiment considered, the circuit 310 is configured for managing an additional control signal referred to as P_CREDIT that is saved in a register.

In particular, the signal P_CREDIT is initialized at the total number of the memory locations of the FIFO memory within stage 8 of the asynchronous pipeline and decremented at each writing of data in the FIFO memory, i.e., when data are received from the transmitter component 1.

Moreover, the signal P_CREDIT is updated at certain instants k to take into account any possible reading operations. For example, said updating can be carried out at every clock cycle of signal CLK_TX, according to the following equation:

$$P\_CREDIT_k = P\_CREDIT_{k-1} + (P\_RP_k - P\_RP_{k-1}) \quad (3)$$

In this case, the circuit 310 is configured for determining the logic value of the signal TX_ACK' also in function of signal P_CREDIT. For example, the logic value of the signal TX_ACK' can be set to '0' in the case where the value of the signal P_CREDIT is zero, i.e., the FIFO memory of the stage 8 is full.

Figure 10:
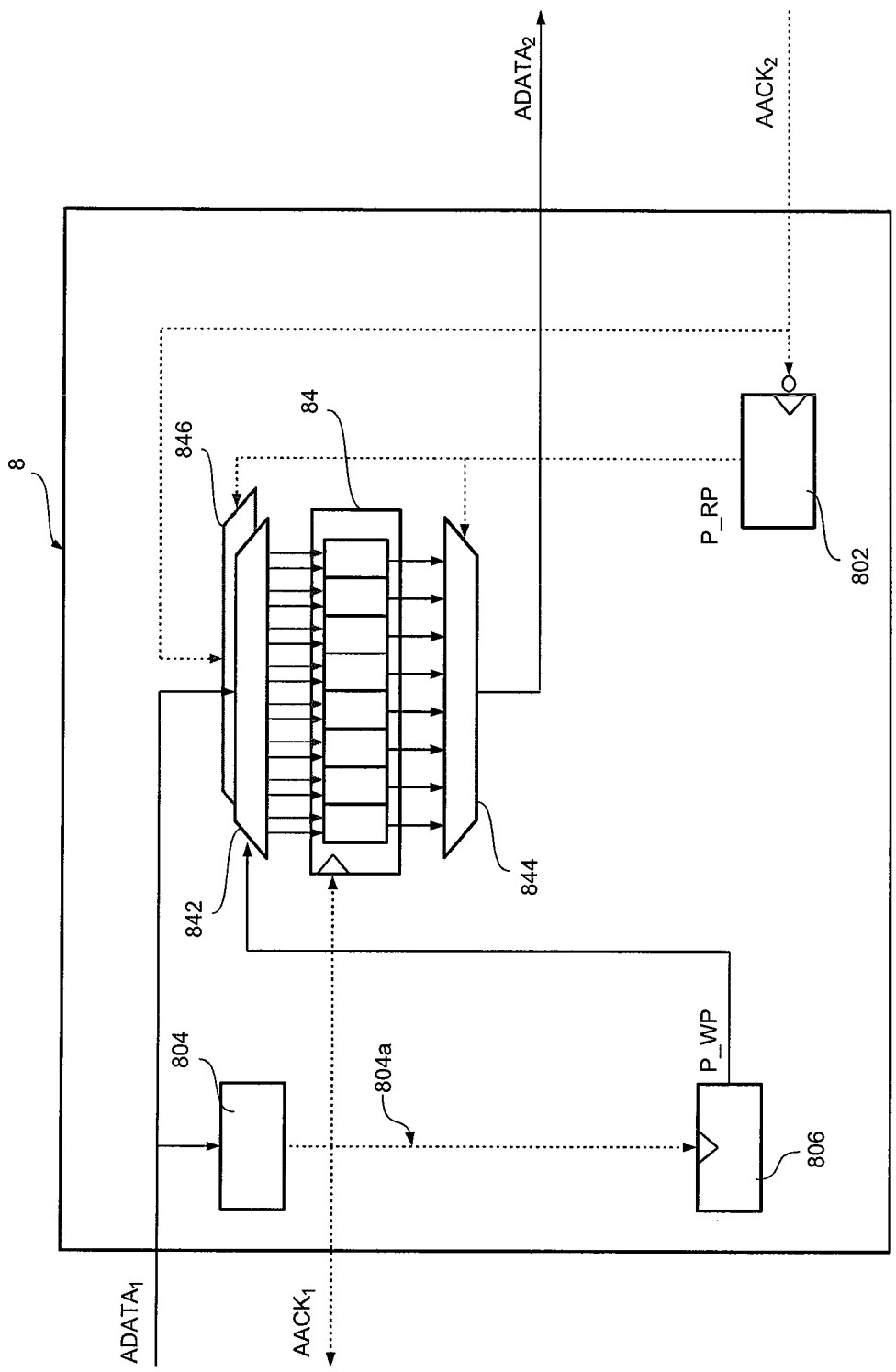
FIG. 10 shows an embodiment of one stage of the pipeline shown in FIG. 9.

FIG. 10 shows a possible embodiment of an asynchronous pipeline stage 8, in which the stage 8 is connected to the preceding stage, such as for example the system 3, via signals ADATA$_1$ and AACK$_1$, and to the next stage, such as for example the system 5, via signals ADATA$_2$ and AACK$_2$.

Substantially, the stage comprises a FIFO memory 84, in which writing is carried out in a way similar to what was previously described for the interface system 5, while reading is carried out in a way similar to what was described previously for the interface system 3.

For example, in the embodiment considered, the control circuit of the stage 8 comprises a detection circuit 804 configured for changing the logic value of a signal 804a when valid data are detected on line ADATA$_1$, i.e., the data line connected to the interface 3. In general, implementation of such circuit 804 depends on the specific asynchronous protocol used. Still, such circuit must guarantee that the logic values of the signal 804a is changed only when the data signal ADATA$_1$ is stabile.

For example, for the exemplary case shown in FIG. 2b, the logic value of the signal 804a is set to '1' when the line ADATA$_1$ contains valid data, and is set again to '0' when all the signals of the line ADATA$_1$ are set to '0'.

In the embodiment considered, said signal 804a is used to save the data on the ADATA$_1$ line in the FIFO memory 84. In particular, in the embodiment considered, such signal is used as a clock signal for writing data in the FIFO memory 84.

In the embodiment considered, said signal 804a is used in addition for incrementing the write pointer P_WP. For example in the embodiment considered, the write pointer P_WP is generated by means of a counter 806, such as for example a counter with Gray encoding, that is autonomously reset when the value of the counter 806 reaches the total number of memory location of the FIFO memory 84. In this case, the signal 804a can be used as a clock signal for the counter 806, so that the counter (and consequently also the write pointer P_WP) is incremented when valid data are detected on the ADATA$_1$ line.

Finally, the signal 804a can also be used to acknowledge reading of the data. For example, in the embodiment considered, the signal 804a is used directly as an AACK$_1$ signal, i.e., as control signal for the interface system 3.

In the embodiment considered, the control circuit of the stage 8 also comprises a second circuit 802 configured for managing the asynchronous communication with the circuit 5 and for generating the read pointer P_RP of the FIFO memory 84.

For example, in the embodiment considered, the circuit 802 is configured for incrementing the read pointer P_RP when the asynchronous signal AACK$_2$ indicates that the transmission of the data ADATA$_2$ is through.

For example, for the case shown in FIG. 2b, the read pointer P_RP is incremented at each falling edge of the signal $AACK_2$.

In the embodiment considered, said operation is implemented via a counter 802 with Gray encoding that is autonomously reset when the value of the counter 802 reaches the total number of memory locations in the FIFO memory 84. In particular, in the embodiment considered, the negated version of the asynchronous signal $AACK_2$ is used directly as a clock signal for said counter 802.

Purely by way of illustration, FIG. 10 shows also the multiplexer and de-multiplexer of the FIFO memory 84. In particular, in the embodiment considered, the FIFO memory 84 comprises a de-multiplexer 842 configured for forwarding the current data on line $ADATA_1$ to the memory location selected via the write pointer P_WP.

In a substantially similar way, the FIFO memory 84 comprises also a multiplexer 844, configured for forwarding the contents of the memory location currently selected via the read pointer P_RP to the next stage, i.e., on the bus $ADATA_2$.

Also in this case, the FIFO memory 84 can be provided by means of a plurality of registers, in which each register comprises a reset port. In this case, it is possible to use a further de-multiplexer 846 configured for connecting the asynchronous signal $AACK_2$ to the reset ports of the registers that correspond to the memory location currently selected via the read pointer PRP.

Therefore, the communication systems described herein allow maximization of the transfer of data transmitted by means of asynchronous communication.

Moreover, the solution is self-adjusting and is insensitive to possible variations caused by tolerances or different production processes. For that reason, the solution is adapted also to implementation with said "standard-cells", which allow shorter design and production times.

Finally, the solution can be used for any combination of two-phase synchronous protocols and four-phase asynchronous protocols.

The person skilled in the art will appreciate also that the pipeline stage shown in FIG. 10 can also find applications in other architectures.

In fact, said stage 8 represents a system for interfacing a first asynchronous circuit 3 with a second asynchronous circuit 5, in which the first asynchronous circuit 3 generates a first data signal $ADATA_1$ according to an asynchronous communication protocol, and in which according to the same asynchronous communication protocol the second asynchronous circuit 5 generates a control signal $AACK_2$ indicative for the transmission state of a second data signal $ADATA_2$. In particular, the stage 8 comprises a First-In First-Out (FIFO) memory 84 comprising a plurality of memory locations, and a control circuit configured for asynchronously writing the first data signal $ADATA_1$ in the FIFO memory 84 when the first data signal $ADATA_1$ indicates the start of a communication, and asynchronously reads the first data signal $ADATA_1$ from the FIFO memory 84 in response to control signal $AACK_2$, in which the data read from the FIFO memory 84 correspond to a second data signal $ADATA_2$.

For example, the solution shown in FIG. 10 efficiently provides the read interface of said stage 8. In fact, the control circuit of stage 8 comprises a counter 802 configured for managing a read pointer P_RP indicating the memory location in the FIFO memory 84 from which the first data signal is read $ADATA_1$, in which the counter 806 is configured for incrementing the read pointer P_RP when the control signal $AACK_2$ indicates that the second asynchronous circuit 5 can receive new data, and in which the control circuit of the stage 8 comprises means 864 for resetting the content of the memory location indicated via the read pointer P_RP when the control signal $AACK_2$ indicates that the second data signal $ADATA_2$ has been sampled. Preferably, such operation is performed by means of a FIFO memory 84, in which every memory location comprises a plurality of registers with corresponding reset ports, in which the control signal $AACK_2$ is connected to the reset ports of the registers that correspond to the memory location indicated via the read pointer P_RP.

Of course, without prejudice to the principle of the invention, the details of implementation and the embodiments may vary widely with respect to what is described and illustrated herein purely by way of example, without thereby departing from the scope of the present invention, as defined in the ensuing claims.

We claim:

1. A communication system for interfacing a first synchronous circuit with a second synchronous circuit comprising:
   a first interface system configured for:
   a) receiving data from said first synchronous circuit according to a synchronous communication protocol;
   b) converting said data received from said first synchronous circuit in data encoded according to an asynchronous communication protocol; and
   c) transmitting said encoded data over a communication channel;
   a second interface system configured for:
   a) receiving said data transmitted over said communication channel;
   b) converting said data transmitted over said communication channel in data decoded according to said asynchronous communication protocol; and
   c) transmitting said decoded data to said second synchronous circuit, wherein said first interface system comprises a first first-in first-out memory for storing temporarily said data received from said first synchronous circuit and said second interface system comprises a second first-in first-out memory for storing temporarily said data transmitted over said communication channel, and wherein said communication system is configured for transmitting to said first synchronous circuit a control signal determined as a function of the state of said first and said second memory such that the first synchronous circuit in communication with, in the first interface system, a converter and the first first-in first-out memory, provides the asynchronous data, and the asynchronous data is received by the second first-in first-out memory in the second interface system, together with a second converter circuit, which in turn is in communication with the second synchronous circuit.

2. The system of claim 1, wherein said control signal comprises an acknowledge signal, which signals to said first synchronous circuit the fact that said first interface system has received said data from said first synchronous circuit.

3. The system of claim 2, wherein said control signal comprises a binary signal, and wherein said communication system is configured for changing the logic value of said control signal, when said first interface system has received said data from said first synchronous circuit and each of said first and said second memory comprises at least one free memory location.

4. The system of claim 3, wherein said communication system is configured for:
   a) managing a first read pointer indicating the memory location from which data temporarily stored in said first memory is read; and b) determining the state of said first memory as a function of said first read pointer.

5. The system of claim 3, wherein said communication system is configured for:
   a) managing a second read pointer indicating the memory location from which data temporarily stored in said second memory is read; and
   b) determining the state of said second memory as a function of said second read pointer.

6. The system of claim 1, further comprising a stage of an asynchronous pipeline between said first and said second interface system, wherein said stage is configured for receiving and forwarding said encoded data from said first interface system and to said second interface system, wherein said stage comprises a third first-In first-Out memory for storing temporarily said data to be forwarded to said second interface system.

7. The system of claim 6, wherein said second and said third memory have the same number of memory locations.

8. The system of claim 6, wherein said second and said third memory have a different number of memory locations, and wherein said communication system is configured for determining said control signal as a function of the state of said third memory.

9. An integrated circuit comprising a first synchronous circuit, a second synchronous circuit, and a communication system for interfacing said first synchronous circuit with said second synchronous circuit, wherein said communication system comprises:
   a first interface system configured for:
   a) receiving data from said first synchronous circuit according to a synchronous communication protocol;
   b) converting said data received from said first synchronous circuit in data encoded according to an asynchronous communication protocol; and
   c) transmitting said encoded data over a communication channel;
   a second interface system configured for:
   a) receiving said data transmitted over said communication channel;
   b) converting said data transmitted over said communication channel in data decoded according to said asynchronous communication protocol; and
   c) transmitting said decoded data to said second synchronous circuit, wherein said first interface system comprises a first first-in first-out memory for storing temporarily said data received from said first synchronous circuit and said second interface system comprises a second first-in first-out memory for storing temporarily said data transmitted over said communication channel, and wherein said communication system is configured for transmitting to said first synchronous circuit a control signal determined as a function of the state of said first and said second memory such that the first synchronous circuit in communication with, in the first interface system, a converter and the first first-in first-out memory, provides the asynchronous data, and the asynchronous data is received by the second first-in first-out memory in the second interface system, together with a second converter circuit, which in turn is in communication with the second synchronous circuit.

10. The integrated circuit of claim 9, wherein said control signal comprises an acknowledge signal, which signals to said first synchronous circuit the fact that said first interface system has received said data from said first synchronous circuit.

11. The integrated circuit of claim 10, wherein said control signal comprises a binary signal, and wherein said communication system is configured for changing the logic value of said first control signal, when said first interface system has received said data from said first synchronous circuit and each of said first and said second memory comprises at least one free memory location.

12. The integrated circuit of claim 11, wherein said communication system is configured for:
   a) managing a first read pointer indicating the memory location from which data temporarily stored in said first memory is read; and
   b) determining the state of said first memory as a function of said first read pointer.

13. The integrated circuit of claim 11, wherein said communication system is configured for:
   a) managing a second read pointer indicating the memory location from which data temporarily stored in said second memory is read; and
   b) determining the state of said second memory as a function of said second read pointer.

14. The integrated circuit of claim 9, further comprising a stage of an asynchronous pipeline between said first and said second interface system, wherein said stage is configured for receiving and forwarding said encoded data from said first interface system and to said second interface system, wherein said stage comprises a third first-In first-Out memory for storing temporarily said data to be forwarded to said second interface system.

15. The integrated circuit of claim 14, wherein said second and said third memory have the same number of memory locations.

16. The integrated circuit of claim 14, wherein said second and said third memory have a different number of memory locations, and wherein said communication system is configured for determining said control signal as a function of the state of said third memory.

17. A communication method for interfacing a first synchronous circuit with a second synchronous circuit comprising:
   receiving data from said first synchronous circuit according to a synchronous communication protocol;
   converting said data received from said first synchronous circuit in data encoded according to an asynchronous communication protocol;
   transmitting said encoded data (ADATA) over a communication channel;
   receiving said data transmitted over said communication channel;
   converting said data transmitted over said communication channel in data decoded according to said asynchronous communication protocol;
   transmitting said decoded data to said second synchronous circuit; and
   storing temporarily said data received from said first synchronous circuit in a first memory and storing temporarily said data transmitted over said communication channel in a second memory such that the first synchronous circuit in communication with a converter and the first memory, provides the asynchronous data, and the asynchronous data is received by the second memory together with a second converter circuit, which in turn is in communication with the second synchronous circuit.

18. The method of claim 17 wherein said first memory comprises a first-in first-out memory.

19. The method of claim 17 wherein said second memory comprises a first-in first-out memory.

20. The method of claim 17 further comprising transmitting to said first synchronous circuit a control signal determined as a function of the state of said first and said second memory.

* * * * *